(12) United States Patent
Iwai et al.

(10) Patent No.: US 9,025,543 B2
(45) Date of Patent: May 5, 2015

(54) WIRELESS COMMUNICATION TERMINAL APPARATUS, WIRELESS COMMUNICATION BASE STATION APPARATUS AND WIRELESS COMMUNICATION METHOD

(75) Inventors: Takashi Iwai, Ishikawa (JP); Seigo Nakao, Kanagawa (JP); Akihiko Nishio, Kanagawa (JP); Daichi Imamura, Kanagawa (JP); Masayuki Hoshino, Kanagawa (JP); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 132 days.

(21) Appl. No.: 13/521,531
(22) PCT Filed: Jan. 13, 2011
(86) PCT No.: PCT/JP2011/000130
§ 371 (c)(1),
(2), (4) Date: Jul. 11, 2012
(87) PCT Pub. No.: WO2011/086920
PCT Pub. Date: Jul. 21, 2011

(65) Prior Publication Data
US 2012/0287770 A1 Nov. 15, 2012

(30) Foreign Application Priority Data
Jan. 14, 2010 (JP) .................................. 2010-006271

(51) Int. Cl.
*H04W 4/00* (2009.01)
*H04B 7/00* (2006.01)
(Continued)

(52) U.S. Cl.
CPC .............. *H04J 13/0062* (2013.01); *H04J 13/18* (2013.01); *H04B 1/713* (2013.01)

(58) Field of Classification Search
CPC ....... H04J 13/18; H04J 13/12; H04J 13/0048; H04J 7/2628; H04B 7/2628; H04L 13/12; H04W 72/04; H04W 88/08

USPC ........................................... 370/209; 375/130
See application file for complete search history.

(56) References Cited

U.S. PATENT DOCUMENTS

2008/0080472 A1* 4/2008 Bertrand et al. ............... 370/344
2008/0318608 A1* 12/2008 Inoue et al. .................... 455/509
(Continued)

FOREIGN PATENT DOCUMENTS

| CN | 101330321 A | 12/2008 |
|---|---|---|
| JP | 2009-4926 A | 1/2009 |
| WO | 2010/150806 A1 | 12/2010 |

OTHER PUBLICATIONS

3GPP TSG RAN WG1, R1-100263, "Channel Sounding Capacity Improvements" dated Jan. 2010.
(Continued)

*Primary Examiner* — Faruk Hamza
*Assistant Examiner* — Abu-Sayeed Haque
(74) *Attorney, Agent, or Firm* — Pearne & Gordon LLP

(57) ABSTRACT

Provided are a wireless communication terminal apparatus, a radio communication base station apparatus and a wireless communication method whereby the increase in the number of signaling bits can be suppressed, while the SRS capacity can be improved. RS type determining unit (105) determines, based on scheduling information, that the signal is an SRS signal accompanied by no data or a DMRS signal accompanied by data. CS amount deciding unit (106) holds a CS amount for DMRS and a CS amount for SRS that are defined such that the CS amount for SRS includes a CS amount not included in the CS amount for DMRS. The CS amount deciding unit (106) uses CS amount notification information, which is included in the scheduling information, and the CS amount definition to derive a CS amount in accordance with the RS type outputted from the RS type determining unit (105).

2 Claims, 20 Drawing Sheets

(51) Int. Cl.
*H04J 3/16* (2006.01)
*H04B 1/00* (2006.01)
*H04J 13/00* (2011.01)
*H04J 13/18* (2011.01)
*H04B 1/713* (2011.01)

(56) References Cited

U.S. PATENT DOCUMENTS

2009/0238241 A1* 9/2009 Hooli et al. .................. 375/133
2009/0245148 A1* 10/2009 McCoy ......................... 370/310
2010/0135273 A1* 6/2010 Kim .............................. 370/344
2010/0232473 A1* 9/2010 Nakao et al. .................. 375/130
2011/0158188 A1* 6/2011 Womack et al. .............. 370/329
2012/0163318 A1 6/2012 Kishiyama et al.
2012/0250742 A1* 10/2012 Tiirola et al. ................. 375/219

OTHER PUBLICATIONS

3GPP TSG RAN WG1 meeting #59, R1-094707, Jeju, South Korea, Nov. 9-13, 2009, "Increasing SRS capacity to support UL MIMO".
International Search Report for PCT/JP2011/000130 dated Feb. 8, 2011.

* cited by examiner

| FIELD | NUMBER OF BITS |
|---|---|
| FORMAT | 1 |
| RB ASSIGNMENT | $\lceil \log_2(N_{RB}(N_{RB}+1)/2) \rceil$ |
| HOPPING FLAG | 1 |
| CRC | 16 |
| MCS + RV | 5 |
| NDI | 1 |
| CQI REQUEST | 1 |
| PUSCH TPC | 2 |
| CYCLIC SHIFT FOR DM RS | 3 |

※ $N_{RB}$ REFERS TO SYSTEM BANDWIDTH

FIG.1

| CS AMOUNT NOTIFICATION | CS AMOUNT FOR DMRS |
|---|---|
| 000 | 0 |
| 001 | 6 |
| 010 | 3 |
| 011 | 4 |
| 100 | 2 |
| 101 | 8 |
| 110 | 10 |
| 111 | 9 |

FIG.3

| CS AMOUNT NOTIFICATION | CS AMOUNT FOR DMRS | CS AMOUNT FOR SRS |
|---|---|---|
| 000 | 0 | 1 |
| 001 | 6 | 5 |
| 010 | 3 | 7 |
| 011 | 4 | 11 |
| 100 | 2 | — |
| 101 | 8 | — |
| 110 | 10 | — |
| 111 | 9 | — |

FIG.6

| CS AMOUNT NOTIFICATION | CS AMOUNT FOR DMRS | CS AMOUNT FOR SRS |
|---|---|---|
| 000 | 0 | 1 |
| 001 | 6 | 7 |
| 010 | 3 | 4 |
| 011 | 4 | 5 |
| 100 | 2 | 3 |
| 101 | 8 | 9 |
| 110 | 10 | 11 |
| 111 | 9 | 10 |

FIG.8

| CS AMOUNT NOTIFICATION | WITHOUT FH | | WITH FH |
| --- | --- | --- | --- |
| | CS AMOUNT FOR DMRS | CS AMOUNT FOR SRS | CS AMOUNT FOR DMRS/SRS |
| 000 | 0 | 1 | 0 |
| 001 | 6 | 7 | 6 |
| 010 | 3 | 4 | 3 |
| 011 | 4 | 5 | 4 |
| 100 | 2 | 3 | 2 |
| 101 | 8 | 9 | 8 |
| 110 | 10 | 11 | 10 |
| 111 | 9 | 10 | 9 |

FIG.12

| CS AMOUNT NOTIFICATION | CS AMOUNT FOR DMRS x (SYMBOL LENGTH)/24[s] | CS AMOUNT FOR SRS x (SYMBOL LENGTH)/24[s] |
| --- | --- | --- |
| 000 | 0 | 2 |
| 001 | 12 | 3 |
| 010 | 6 | 10 |
| 011 | 8 | 11 |
| 100 | 4 | 14 |
| 101 | 16 | 15 |
| 110 | 20 | 22 |
| 111 | 18 | 23 |

FIG.16

| CS AMOUNT NOTIFICATION | CS AMOUNT FOR DMRS × (SYMBOL LENGTH)/24 [s] | CS AMOUNT FOR SRS × (SYMBOL LENGTH)/24 [s] |
|---|---|---|
| 0000 | 0 | 1 |
| 0001 | 12 | 2 |
| 0010 | 6 | 3 |
| 0011 | 8 | 5 |
| 0100 | 4 | 7 |
| 0101 | 16 | 9 |
| 0110 | 20 | 10 |
| 0111 | 18 | 11 |
| 1000 | – | 13 |
| 1001 | – | 14 |
| 1010 | – | 15 |
| 1011 | – | 17 |
| 1100 | – | 19 |
| 1101 | – | 21 |
| 1110 | – | 22 |
| 1111 | – | 23 |

FIG. 18

| CS AMOUNT NOTIFICATION | CS AMOUNT FOR DMRS × (SYMBOL LENGTH)/24[s] | CS AMOUNT FOR SRS × (SYMBOL LENGTH)/24[s] |
|---|---|---|
| 000 | 0 | 1 |
| 001 | 12 | 2 |
| 010 | 6 | 9 |
| 011 | 8 | 10 |
| 100 | 4 | 13 |
| 101 | 16 | 14 |
| 110 | 20 | 21 |
| 111 | 18 | 22 |

FIG.20

WIRELESS COMMUNICATION TERMINAL APPARATUS, WIRELESS COMMUNICATION BASE STATION APPARATUS AND WIRELESS COMMUNICATION METHOD

TECHNICAL FIELD

The present invention relates to a radio communication terminal apparatus, a radio communication base station apparatus, and a radio communication method.

BACKGROUND ART

For uplink of LTE-Advanced, which is an advanced form of 3GPP LTE (3rd Generation Partnership Project Long Term Evolution), support for transmission by a plurality of antennas of a terminal (SU-MIMO (Single. User-Multiple Input Multiple Output)) has been studied. SU-MIMO is a technique in which one terminal transmits data signals from a plurality of antenna ports at the same time and at the same frequency, and spatial multiplexing of the data signals is attained using virtual communication paths (streams) in a space.

To effectively improve performance by SU-MIMO, a base station needs to know the conditions of the propagation paths from the antennas of the terminal by using a sounding reference signal (hereinafter referred to as "SRS"). Therefore, the terminal needs to transmit the SRS from each antenna. The sounding means estimation of the quality of a propagation path between the terminal and the base station.

The SRS of LTE is time-multiplexed with data at the end symbol of a subframe and transmitted in order to estimate the channel quality of an uplink data channel.

In LTE, only one transmission antenna is used and only one SRS is transmitted to the terminal. When the terminal includes N antennas in LTE-Advanced, however, the overhead for the SRS transmission increases by N-fold, which may cause lack of the SRS area.

Consequently, to improve the number of SRSs that can be transmitted in a cell per unit time, i.e. the SRS capacity, a method of using code resources for a data demodulation reference signal (hereinafter referred to as "DMRS") is known (see Non Patent Literature 1).

Non Patent Literature 1 discloses that the base station directs the terminal to use uplink scheduling information (also referred to as UL Grant) to transmit the SRS. FIG. 1 shows information notified in the UL grant to indicate transmission of a data signal of LTE. The UL grant includes a predetermined number of bits indicating frequency resource information of signal (RB assignment), an amount of cyclic shift for DMRS (hereinafter referred to as "CS amount"), and the like.

When the terminal is directed through the UL grant from the base station to transmit the SRS, the terminal transmits the SRS in an SC-FDMA (Single Carrier-Frequency Division Multiple. Access) symbol where the DMRS in a PUSCH (Physical Uplink Shared Manned) should be placed. As shown in FIG. 2, the DMRS is transmitted using a central symbol of each slot of one subframe (two-slot configuration), which is a scheduling unit of the data signal. The DMRS and SRS are signals using cyclic shift sequence Obtained by cyclically shifting data of the same sequence (ZC sequence). Therefore, the SRS can be code-multiplexed with the DMRS in the same band by using a CS amount different from that of the DMRS.

Thus, although the SRS is to be transmitted only using the end symbol of one subframe according to the specification of LTE, the SRS can also be transmitted using the central symbol of the slot (DMRS symbol position). Therefore, the SRS capacity can be improved.

In the following explanation, the SRS to be transmitted by the direction in the UL grant from the base station will be referred to as a scheduled SRS.

If a UL grant for transmitting the scheduled SRS is newly added, the terminal needs to detect two types of UL grants including the UL grant for data transmission, which makes the transmission/reception processing of the terminal and the base station complicated. Therefore, it is likely that the UL grant for scheduled SRS transmission also serves as the UL grant for data (DMRS) transmission shown in FIG. 1.

In this case, a parameter "MCS+RV" indicating the transmission size of data can be used for distinction between the data transmission and the scheduled SRS transmission. More specifically, transmission of the scheduled SRS can be indicated by setting the transmission size of data to 0.

The number of CS notification bits for SRS is 3 bits, just like the number of CS notification bits for data (Cyclic shift for DMRS in FIG. 1).

CITATION LIST

Non Patent Literature

NPL 1 R1-094707, Huawei, "Increasing SRS capacity to support UL MIMO"

SUMMARY OF INVENTION

Technical Problem

In LTE, the minimum allocation bandwidth of the transmission signal (data, DMRS, and SRS) is set to 12 subcarriers (=1 RB (Resource Block)). In this case, 12 CS amounts of "0, 1, ..., 10, 11"×(symbol length)/12 [s] can be defined, and up to 12 orthogonal CS sequences can be generated.

However, the CS amount can be notified using only 3 bits in the UL grant. Specifically, only the CS amount of "0, 2, 3, 4, 6, 8, 9, 10" can be notified in the UL grant as shown in FIG. 3. For this reason, the code multiplexing number of the DMRSs and scheduled SRSs is limited to eight at the maximum.

As described above, according to Non Patent Literature 1, the CS notification information included in the UL grant has 3 bits, so that only eight CS amounts among 12 defined CS amounts can be notified. In this respect, there is a problem that the SRS capacity cannot be sufficiently improved since the base station cannot flexibly code-multiplex the DMRSs and scheduled SRSs.

An object of the present invention is to provide a radio communication terminal apparatus, a radio communication base station apparatus, and a radio communication method that improve the SRS capacity while suppressing an increase in the number of signaling bits,

Solution to Problem

A radio communication terminal apparatus according to one aspect of the present invention comprises: a receiver configured to receive notification information for notifying an amount of cyclic shift used for a reference signal; a determination unit configured to determine the amount of cyclic shift corresponding to the received notification information for a data demodulation reference signal or a sounding reference signal, an amount of cyclic shift not included in the amount of cyclic shift for the data demodulation reference signal being set as the amount of cyclic shift for the sounding reference signal and being associated with the notification information along with the amount of cyclic shift for the data demodulation reference signal; and a transmitter configured to transmit the data demodulation reference signal or the sounding reference signal using the determined amount of cyclic shift.

A radio communication base station apparatus according to one aspect of the present invention comprises: a transmitter configured to transmit notification information for notifying an amount of cyclic shift used for a reference signal; a determination unit configured to determine the amount of cyclic shift corresponding to the transmitted notification information for a data demodulation reference signal or a sounding reference signal, an amount of cyclic shift not included in the amount of cyclic shift for the data demodulation reference signal being set as the amount of cyclic shift for the sounding reference signal and being associated with the notification information along with the amount of cyclic shift for the data demodulation reference signal; and an extraction unit configured to extract the data demodulation reference signal or the sounding reference signal included in a reception signal using the determined amount of cyclic shift.

A radio communication method according to one aspect of the present invention comprises: receiving notification information for notifying an amount of cyclic shift used for a reference signal; determining the amount of cyclic shift corresponding to the received notification information for a data demodulation reference signal or a sounding reference signal, an amount of cyclic shift not included in the amount of cyclic shift for the data demodulation reference signal being set as the amount of cyclic shift for the sounding reference signal and being associated with the notification information along with the amount of cyclic shift for the data demodulation reference signal; and transmitting the data demodulation reference signal or the sounding reference signal using the determined amount of cyclic shift.

Advantageous Effects of Invention

According to the present invention, it is made possible to improve the SRS capacity while suppressing an increase in the number of signaling bits.

BRIEF DESCRIPTION OF DRAWINGS

FIG. 1 is a diagram showing information notified in a UL grant to indicate transmission of a data signal of LTE;

FIG. 3 is a diagram showing CS amounts for DMRS disclosed in Non Patent Literature 1;

FIG. 6 is a diagram showing definitions of the CS amount for DMRS and the CS amount for SRS according to Embodiment 1 of the present invention;

FIG. 8 is a diagram showing other definitions of the CS amount for DMRS and the CS amount for SRS according to Embodiment 1 of the present invention;

FIG. 12 is a diagram showing definitions of the CS amount for DMRS and the CS amount for SRS according to Embodiment 2 of the present invention;

FIG. 16 is a diagram showing definitions of the CS amount for DMRS and the CS amount for SRS according to Embodiment 3 of the present invention;

FIG. 18 is a diagram showing still other definitions of the CS amount for DMRS and the CS amount for SRS according to Embodiment 3 of the present invention;

FIG. 20 is a diagram showing yet other definitions of the CS amount for DMRS and the CS amount for SRS according to Embodiment 3 of the present invention.

DESCRIPTION OF EMBODIMENTS

Figure 2:
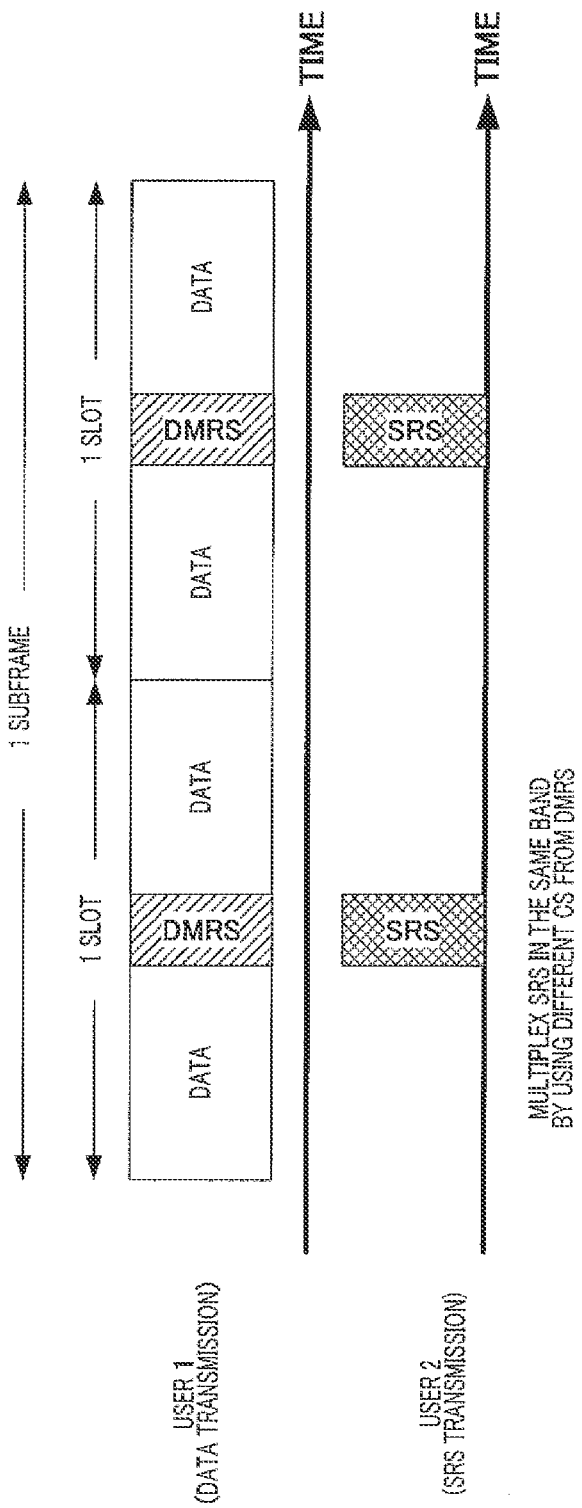
FIG. 2 is a diagram showing how DMRSs and SRSs are arranged on central symbols of slots.

Hereinafter, embodiments of the present invention will be described in detail with reference to the drawings. In embodiments, configurations with the same functions are designated with the same reference numerals, and overlapped description will be omitted.

Embodiment 1

Figure 4:
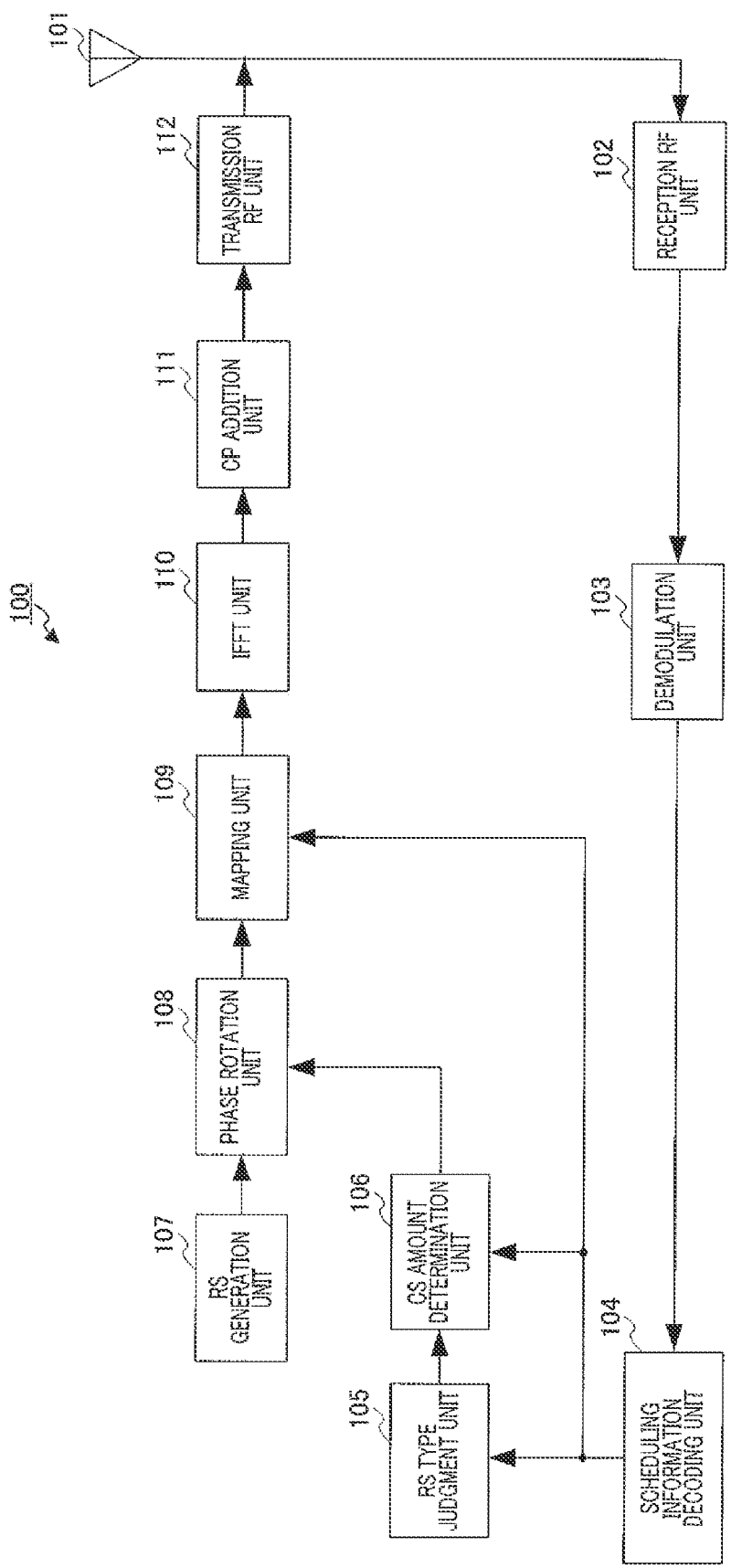
FIG. 4 is a block diagram showing a configuration of a terminal according to Embodiment 1 of the present invention.

FIG. 4 is a block diagram showing a configuration of radio communication terminal apparatus (hereinafter referred to as "terminal") 100 according to Embodiment 1of the present invention. Hereinafter, FIG. 4 will be used to describe the configuration of the terminal.

Reception RF unit 102 receives a signal transmitted from a radio communication base station apparatus (hereinafter referred to as "base station") through antenna 101 and applies reception processing, such as down-conversion and A/D conversion, to the reception signal and outputs the reception signal to demodulation unit 103. Demodulation unit 103 demodulates uplink scheduling information (UL grant) from the reception signal output from reception RF unit 102 and outputs the demodulated scheduling information to scheduling information decoding unit 104.

Scheduling information decoding unit 104 decodes the scheduling information output from demodulation unit 103 and outputs the scheduling information to RS type judgment unit 105, CS amount determination unit 106, and mapping unit 109. The scheduling information includes CS notification information for reference signal, allocation band information of transmission signal, data size, power conditioner information, and the like as shown in FIG. 1.

Based on the scheduling information output from scheduling information decoding unit 104, RS type judgment unit 105 judges whether the reference signal (RS) to be transmitted is DMRS or SRS and outputs the judged RS type to CS amount determination unit 106.

According to the RS type output from RS type judgment unit 105, CS amount determination unit 106 uses one of the definitions of the CS amount for DMRS and the CS amount for SRS (correspondence between the CS notification information (3 bits) and the CS amount[s]) held in advance and determines the CS amount of the RS sequence corresponding to the CS notification information included in the scheduling information and outputs the determined CS amount to phase rotation unit 108. The CS amount for SRS is defined to include a CS amount not included in the CS amount defined for DMRS, and the base station and terminal 100 share the CS amount for SRS in advance. Details of CS amount determination unit 106 will be described later.

RS generation unit 107 generates an SRS or IMPS sequence (ZC sequence and outputs the generated RS sequence to phase rotation unit 108.

Based on the CS amount output from CS amount determination unit 106, phase rotation unit 108 applies phase rotation equivalent to the CS amount in the time domain to each sample of the RS sequence output from RS generation unit 107 and outputs the RS sequence to mapping unit 109. The RS sequence is a signal in the frequency domain, because each sample is allocated to a subcarrier. The phase rotation processing in the frequency domain is equivalent to cyclic shift processing in the time domain. Specifically, the process of applying phase rotation processing of M×360/12×n [degrees] (M×0, 1, . . . , 10, 11) to each sample a of the RS sequence in the frequency domain in phase rotation unit 108 is equivalent to applying cyclic shift processing of CS amount=M×(symbol length)/12 [s] in the time domain.

According to the allocation band information output from scheduling information decoding unit 104, mapping unit 109 maps the RS sequence output from phase rotation unit 108 to resources in the frequency domain and outputs the mapped signal to IFFT (Inverse Fast Fourier Transform) unit 110.

IFFT unit 110 applies IFFT processing to the signal output from mapping unit 109 and outputs the signal applied with the IFFT processing to CP (Cyclic Prefix) addition unit 111. CP addition unit 111 adds the same signal as the end portion of the signal output from IFFT unit 110 to the top of the signal as the CP and outputs the signal to transmission RF unit 112.

Transmission RF unit 112 applies transmission processing, such as D/A conversion, up-conversion, and amplification, to the signal output from CP addition unit 111 and transmits the signal applied with the transmission processing through antenna 101 as DMRS or SRS.

Figure 5:
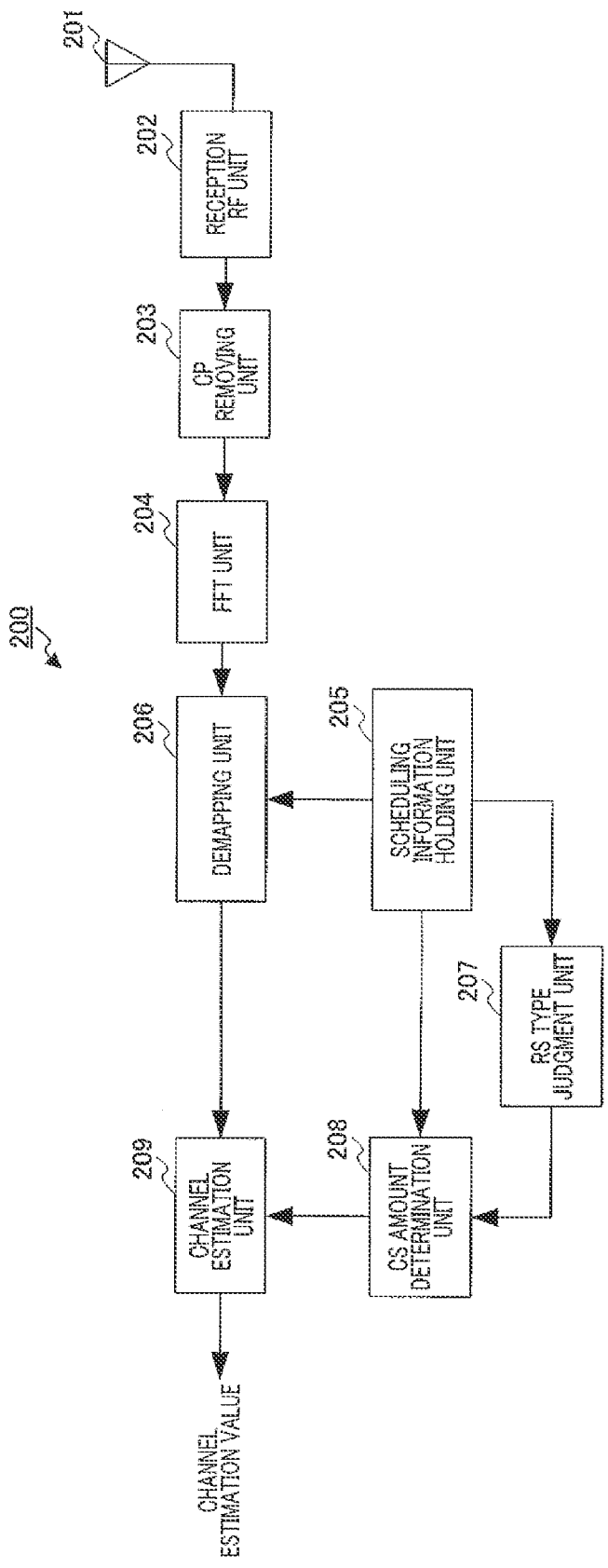
FIG. 5 is a block diagram showing a configuration of a base station according to Embodiment 1 of the present invention.

FIG. 5 is a block diagram showing a configuration of radio communication base station apparatus (hereinafter referred to as "base station") 200 according to Embodiment 1 of the present invention. Hereinafter, the configuration of base station 200 will be described using FIG. 5.

Reception RF unit 202 applies reception processing, such as down-conversion and A/D conversion, to the signal received through antenna 201 and outputs the signal applied with the reception processing to CP removing unit 203. CP removing unit 203 removes the CP added to the top of the reception signal output from reception RF unit 202 and outputs the reception signal to FFT (Fast Fourier Transform) unit 204.

FFT unit 204 applies FFT processing to the reception signal output from CP removing unit 203 to convert the reception signal to a signal in the frequency domain and outputs the signal converted in the frequency domain to demapping unit 206.

Scheduling information holding unit 205 holds uplink scheduling information notified from a transmission unit (not shown) to terminal 100 and outputs scheduling information of a desired terminal for reception to demapping unit 206, RS type judgment unit 207, and CS amount determination unit 208.

According to the allocation band information of the desired terminal included in the scheduling information output from scheduling information holding unit 205, demapping unit 206 extracts a signal corresponding to the transmission band of the desired terminal from the signal in the frequency domain output from FFT unit 204 and outputs the extracted signal to channel estimation unit 209. Demapping unit 206 functions as an extraction unit.

Based on the scheduling information output from scheduling information holding unit 205, RS type judgment unit 207 judges the RS type (DMRS or SRS) transmitted by the desired terminal and outputs the judged RS type to CS amount determination unit 208.

According to the RS type output from RS type judgment unit 207, CS amount determination unit 208 uses one of the definitions of the CS amount for DMRS and the CS amount for SRS held in advance (correspondence between CS notification information (3 bits) and CS amount[s]) to determine the CS amount corresponding to the CS notification information included in the scheduling information and outputs the determined CS amount to channel estimation unit 209.

Channel estimation unit 209 obtains a correlation signal in the frequency domain acquired by complex division of the signal (SRS or DMRS) output from demapping unit 206 and the RS sequence known between the transmission and the reception. Channel estimation unit 209 further applies IDFT processing to the correlation signal in the frequency domain to calculate a correlation signal (delay profile) in the time domain. The delay profile includes reference signals of a plurality of terminals. Therefore, the CS amount of the desired terminal output from CS amount determination unit 208 is used to mask information other than the information equivalent to the CS amount of the desire terminal of the delay profile, and the channel estimation value of the desired terminal is extracted and output. If the signal (reception RS) output from demapping unit 206 is a SRS, the obtained channel estimation value is used for scheduling (frequency allocation, MCS selection, and the like) of the terminal in the cell of base station 200. If the reception RS is DMRS, the obtained channel estimation value is used for demodulation (frequency domain equalization process) of accompanying data signal.

Operations of RS type judgment unit 105 and CS amount termination unit 106 of terminal 100 will be described. Here, since RS type judgment unit 207 and CS amount determination unit 208 of base station 200 also perform similar operations as RS type judgment unit 105 and CS amount determination unit 106, respectively, the description of the operations will be omitted.

RS type judgment unit 105 judges the type of the RS to be transmitted, based on the scheduling information. An example of a specific determination method includes determining the type based on the data size (MCS+RV of FIG. 1). More specifically, RS type judgment unit 105 judges the type to be the SRS signal without accompanying data if the data size is 0 and judges the type to be the DMRS signal with accompanying data if the data size is greater than 0. In the data transmission, a method of presetting a rarely set parameter setting value as SRS transmission may also be adopted. RS type judgment unit 105 outputs the judgment result to CS amount determination unit 106.

CS amount determination unit 106 holds the definitions of the CS amount for DMRS and the CS amount for SRS. The definitions are set in advance for each system or each base station, and the base station and the terminal share the definitions, FIG. 6 shows the definitions of the CS amount for DMRS and the CS amount for SRS. As shown in FIG. 6, the CS amount for SRS is defined to include the CS amount not included in the CS amount for DMRS, i.e. 1, 5, 7, 11". Arbitrary CS amounts are allocated to four patterns other than these CS amounts. For example, four patterns of the CS amount included in the CS amount for DMRS, such as "0, 2, 4, 6", may be defined for the other four patterns. Meanwhile, remaining patterns may also be used to include information other than the CS amount.

CS amount determination unit 106 uses the CS amount notification information (3 bits) included in the scheduling information and the definitions of the CS amounts to derive the CS amount corresponding to the RS type output from RS type judgment unit 105. For example, when the definitions of FIG. 6 are used and the CS amount notification information indicates "000," CS amount determination unit 106 derives the CS amount=1(×(symbol length)/12 [s]) in SRS transmission and derives the CS amount=0 (×(symbol length)/12 [s]) in DMRS transmission. The derived CS amount is output to phase rotation unit 108.

Figure 7:
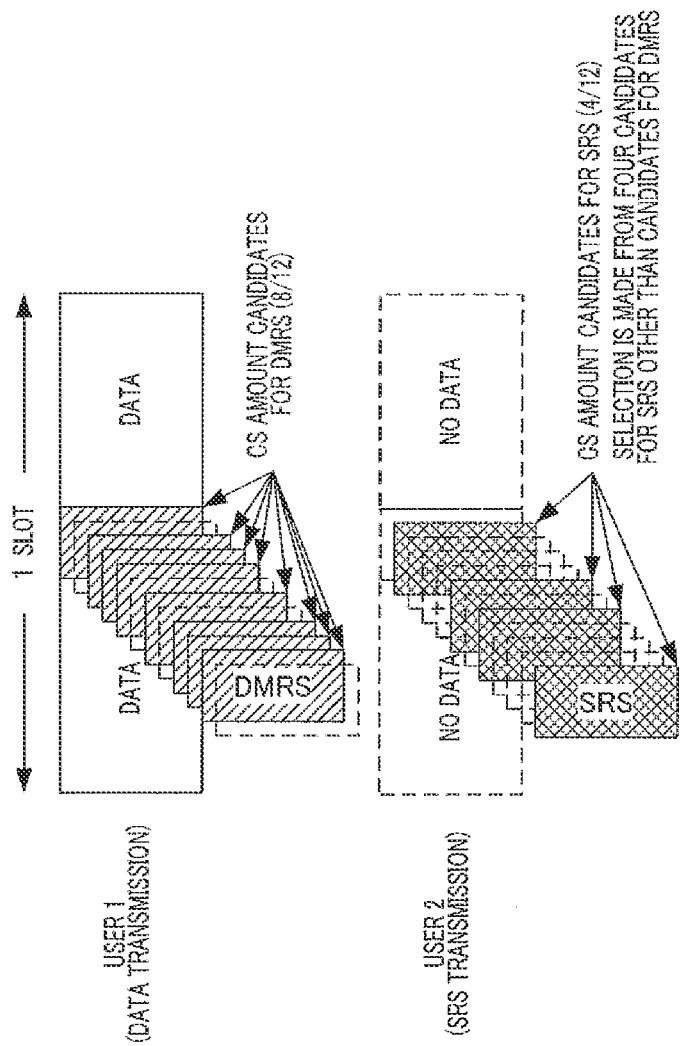
FIG. 7 is a schematic diagram showing how DMRSs and SRSs are multiplexed.

In this way, as CS amount determination unit 106 determines the CS amount for RS, the DMRS selected from eight CS amounts for DMRS used by user 1 who performs data transmission and the SRS selected from four CS amounts for SRS used by user 2 who does not perform data transmission can be multiplexed as shown in FIG. 7.

According to Embodiment 1, as for the CS amount for RS included in the scheduling information notified from the base station to the terminal, the CS amount for DMRS and the CS amount for SRS are defined so that the CS amount for SRS includes a CS amount not included in the CS amount for DMRS. In this way, all the 12 resources for the CS amount can be used for code multiplexing the DMRS and SRS. As a result, the SRS capacity can be improved.

Although the case of defining the CS amount for SRS shown in FIG. 6 is described in the present embodiment, the CS amount for SRS may also be defined as follows.

The eight patterns "0, 2, 3, 4, 6, 8, 9, 10" of the CS amount for DMRS that can be notified as the scheduling information shown in FIG. 3 include all even numbers of CS amount among the 12 patterns that can be set. Therefore, the CS amount for SRS may be set by shifting the CS amount for DMRS by one as shown in FIG. 8. The simple process of shifting the CS amount by one makes it possible to use all the 12 resources for the CS amount. In this way, the terminal does not have to hold the definition of the CS amount for SRS in the memory, and addition processing of shifting the definition of the CS amount for DMRS by one can derive the definition of the CS amount for SRS. Although the CS amount for SRS is defined by shifting the CS amount for DMRS by adding one in FIG. 8, but may be defined by shifting the CS amount for DMRS by subtracting one.

When FIG. 8 is used for the definition of the CS amount for SRS, the SRSs of slots 1 and 2 may be multiplied by a length-2 Walsh sequence (1, −1). More specifically, the SRS of slot 1 is multiplied by 1, and the SRS of slot 2 is multiplied by −1. In this way, the number of code resources that can be multiplexed can be extended to a total of 16 in the CS sequence (eight patterns) and the Walsh sequence (two patterns). Therefore, the SRS capacity can be improved.

If the channel variation is large between the slots, the orthogonality of the Walsh code breaks down, and an intercode interference is generated between signals using the same CS amount. Therefore, if code resources with the same CS amounts are used for DMRS and SRS when the 16 code resources are defined as described above (when both the DMRS and SRS use 3, 4, 9, 10), the intercode interference increases due to the break down of the orthogonality of the Walsh code. Therefore, the base station sets the CS amounts so that the CS amounts of MARS and SRS do not match, i.e., so that the DMRS and SRS do not use 3, 4, 9, 10 at the same time. This can make the DMRS and SRS orthogonal both in the CS sequence and the Walsh sequence (can set different sequences) and reduce the intercode interference.

Figure 9:
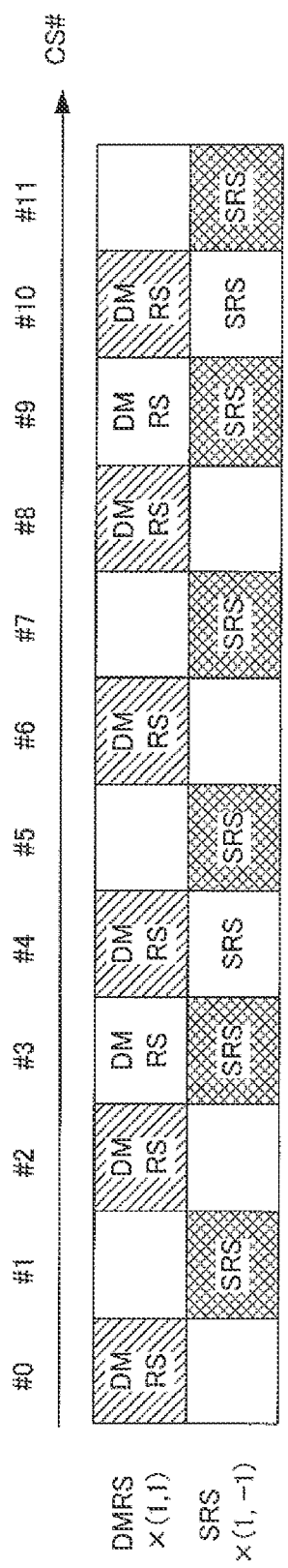
FIG. 9 is a diagram showing how the CS amounts for SRSs and DMRSs are shifted by one CS.

Specifically, as shown in FIG. 9, code multiplexing can be set by shifting the CS amounts of the SRS and DMRS by one CS, and the influence of the break down of the orthogonality of the Walsh code can be compensated. For example, if there is a channel variation between the slots, the orthogonality of the Walsh code breaks down, and a terminal that uses a different Walsh sequence is interfered. The influence of the interference is the largest for the same CS amount. Therefore, the CS amounts for DMRS and SRS can be shifted by one CS as shown in FIG. 9 to avoid setting the same CS amounts even if the Walsh codes are different. In this way, the influence of the break down of the orthogonality of the Walsh code can be compensated.

Embodiment 2

Figure 10:
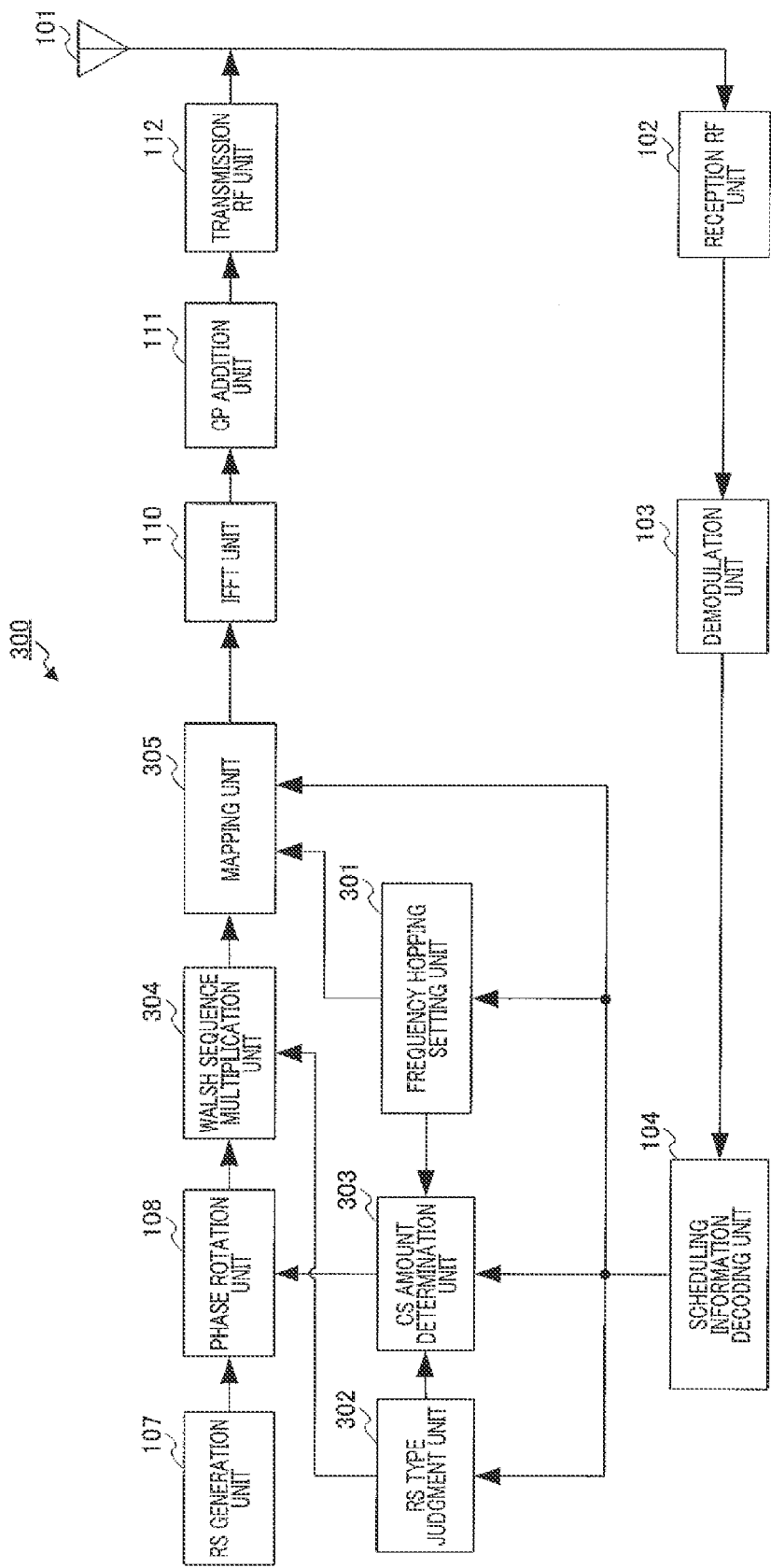
FIG. 10 is a block diagram showing a configuration of a terminal according to Embodiment 2 of the present invention.

FIG. 10 is a block diagram showing a configuration of terminal 300 according to Embodiment 2 of the present invention. Hereinafter, the configuration of terminal 300 will be described using FIG. 10. FIG. 10 is different from FIG. 4 in that frequency hopping setting unit 301 and Walsh sequence multiplication unit 304 are added, RS type judgment unit 105 is changed to RS type judgment unit 302, CS amount determination unit 106 is changed to CS amount determination unit 303, and mapping unit 109 is changed to mapping unit 305.

Based on the scheduling information output from scheduling information decoding unit 104, frequency hopping setting unit 301 derives presence/absence of inter-slot frequency hopping (FH) and outputs information (FH flag) of the derived present/absence of the FH to CS amount determination unit 303 and mapping unit 305.

Based on the scheduling information output from scheduling information decoding unit 104, RS type judgment unit 302 judges whether the RS to be transmitted is DMRS or SRS and outputs the judged RS type to CS amount determination unit 303 and Walsh sequence multiplication unit 304.

CS amount determination unit 303 switches the definition of the CS amount according to the presence/absence of the FH output from frequency hopping setting unit 301. Specifically, CS amount determination unit 303 sets the CS amount for SRS to the same definition as the CS amount for DMRS if there is Fit and sets the definition obtained by shifting the CS amount for SRS front the CS amount for DMRS by one CS (the same definition as shown in FIG. 8 of Embodiment 1) if there is no FH. CS amount determination unit 303 uses the CS amount notification information (3 bits) included in the scheduling information and the definition of the switched CS amount to derive the CS amount corresponding to the RS type output from RS type judgment unit 302 and outputs the derived CS amount to phase rotation unit 108. Details of the definition of the CS amount will be described later.

According to the RS type output from RS type judgment unit 302, Walsh sequence multiplication unit 304 multiplies the signal output from phase rotation unit 108 by a length-2 Walsh sequence and outputs the multiplication result to mapping unit 305. Specifically, if the RS type is SRS, Walsh sequence multiplication unit 304 multiplies the RSs of slots 1 and 2 by a length-2 Walsh sequence (1, −1). On the other hand, if the RS type is the DMRS, Walsh sequence multiplication unit 304 multiplies the RSs of slots 1 and 2 by a Walsh sequence (1, 1) of sequence length 2. The values before and after the multiplication are equivalent in the multiplication of the Walsh sequence (1, 1).

Mapping unit 305 uses the allocation band information included in the scheduling information output from scheduling information decoding unit 104 and the information of the presence/absence of the FH output from frequency hopping setting unit 301 and sets the allocation bands of RS for slots 1 and 2. Mapping unit 305 shifts (hops) the frequency hand of the allocation band by a predetermined amount between the slots if there is FH. Meanwhile, if there is no FH, mapping unit 305 sets the same allocation band to the RSs of slots 1 and 2 according to the allocation band information. Mapping unit 305 maps the signal output from Walsh sequence multiplication unit 304 to the set allocation band and outputs the mapped signal to IFFT unit 110.

Figure 11:
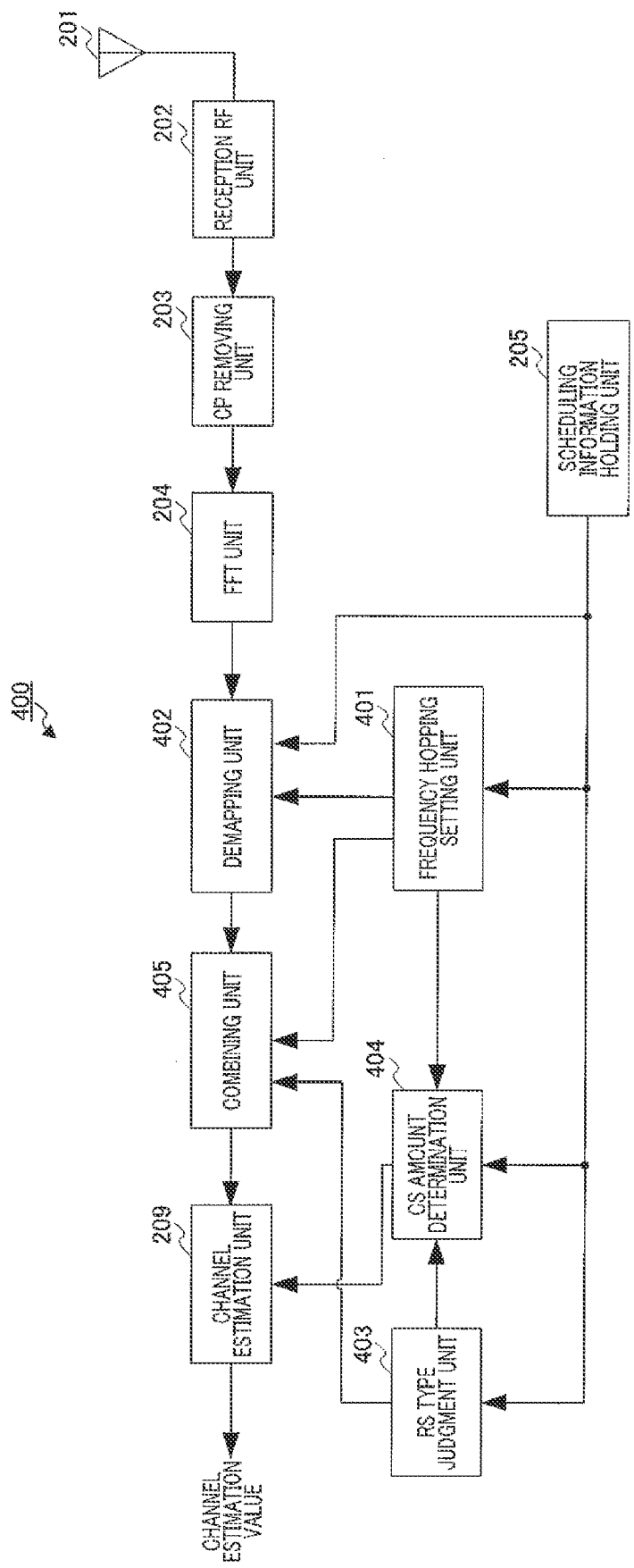
FIG. 11 is a block diagram showing a configuration of a base station according to Embodiment 2 of the present invention.

FIG. 11 is a block diagram showing a configuration of base station 400 according to Embodiment 2 of the present invention. Hereinafter, the configuration of base station 400 will be described using FIG. 11. FIG. 11 is different from FIG. 5 in that frequency hopping setting unit 401 and combining unit 405 are added, demapping unit 206 is changed to demapping unit 402, RS type judgment unit 207 is changed to RS type judgment unit 403, and CS amount determination unit 208 is changed to CS amount determination unit 404.

Frequency hopping setting unit 401 is similar to frequency hopping setting unit 301 of terminal 300 shown in FIG. 10. Based on the scheduling information output from the scheduling information holding unit 205, frequency hopping setting unit 401 derives the presence/absence of the inter-slot frequency hopping (Hi) and outputs the information of the derived presence/absence of the FH to demapping unit 402, CS amount determination unit 404, and combining unit 405.

According to the allocation band information of a desired terminal included in the scheduling information output from scheduling information holding unit 205 and the information of the presence/absence of the FH output from frequency hopping setting unit 401, demapping unit 402 extracts a signal corresponding to the transmission band of the desired terminal from the signals in the frequency domain of slots 1 and 2 output from FFT unit 204 and outputs the extracted signal to combining unit 405.

Based on the scheduling information output from scheduling information holding unit 205, RS type judgment unit 403 judges the RS type transmitted by the desired terminal and outputs the judged RS type to CS amount determination unit 404 and combining unit 405.

CS amount determination unit 404 uses the definition of the CS amount based on the RS type output from RS type judgment unit 403 and based on the information of the presence/absence of the FH output from frequency hopping setting unit 401 to determine the CS amount corresponding to the CS amount notification information (3 bits) included in the scheduling information and outputs the determined CS amount to channel estimation unit 209

Combining unit 405 multiplies the RSs of slots 1 and 2 output from demapping unit 402, by the same Walsh sequence as that for the transmission side according to the RS type output from RS type judgment unit 403. More specifically, combining unit 405 multiplies the RSs by the Walsh sequence (1, −1) if the RS type is the SRS, and multiplies the RSs by the Walsh sequence (1, 1) if the RS type is the DMRS. According to the presence/absence of the FR, combining unit 405 performs in-phase combining or power combining of the RSs of slots 1 and 2 after the multiplication by the Walsh sequence and outputs the combined RS to channel estimation unit 209. If there is FH, since the frequency bands of the reception RSs of slots 1 and 2 are different, the channel variation between the slots is large. The power combining is performed in this case because the in-phase combining cannot be performed. If there is no FR, the channel variation between the slots is small. Therefore, the in-phase combining is performed.

Next, an operation of CS amount determination unit 303 of terminal 300 described above will be described. Here, CS amount determination unit 404 of base station 400 also performs a similar operation as CS amount determination unit 303. Therefore, the description of CS amount determination unit 404 will be omitted herein.

CS amount determination unit 303 determines the CS amount for RS based on the RS type, i.e. whether the RS is SRS or DMRS, and the definition of the CS amount cm-responding to the presence/absence of the FH (correspondence between the CS notification information (3 bits) and the CS amount[s]).

In addition, CS amount determination unit 303 holds the definitions of the CS amount for DMRS and the CS amount for SRS corresponding to the presence/absence of the FR. The definitions are set in advance for each system and each base station, and base station 400 and terminal 300 share the definitions. FIG. 12 shows the definitions of the CS amount for DMRS and the CS amount for SRS corresponding to the presence/absence of the FH. As shown in FIG. 12, the CS amount for DMRS is shifted from the CS amount for SRS by adding one CS in the definition if there is no FH. On the other hand, the same definition as the CS amount for DMRS is set for the CS amount for SRS if there is FR.

When the definitions in FIG. 12 are used and the CS amount notification information indicates "000," the CS amount=1 (×(symbol length)/12 [s]) is derived if there is FH in the SRS transmission, while the CS amount=0 (×(symbol length)/12 [s]) is derived if there is no FH in the SRS transmission. The derived CS amount is output to phase rotation unit 108.

Figure 13:
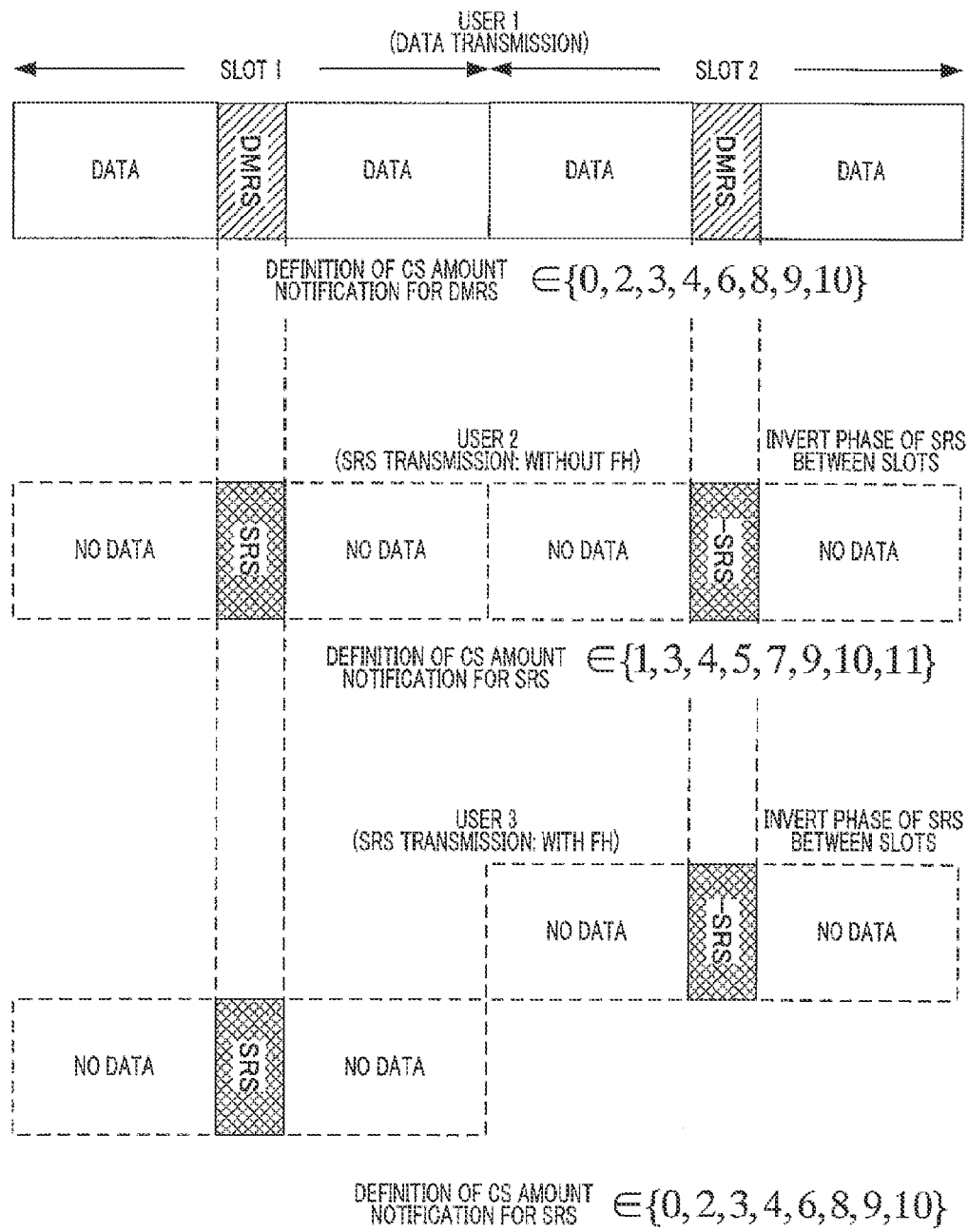
FIG. 13 is a diagram showing how RSs are allocated to three users according to the definitions of FIG. 12.

FIG. 13 shows how RSs are allocated to three users according to the definitions of FIG. 12. User 1 is involved in data transmission, and DMRSs are arranged in slots 1 and 2. User 2 is not involved in data transmission, and there is no FH. The SRSs multiplied by the Walsh sequence (1, −1) are arranged in slots 1 and 2. User 3 is not involved in data transmission, and there is FH. The SRSs multiplied by the Walsh sequence (1, −1) are arranged in slots 1 and 2.

In this way, switching the definition of the CS amount for SRS according to the presence/absence of the FH included in the scheduling information enables base station 400 to perform an appropriate operation according to the code multiplexing number of the DMRSs and SRSs.

Figure 14:
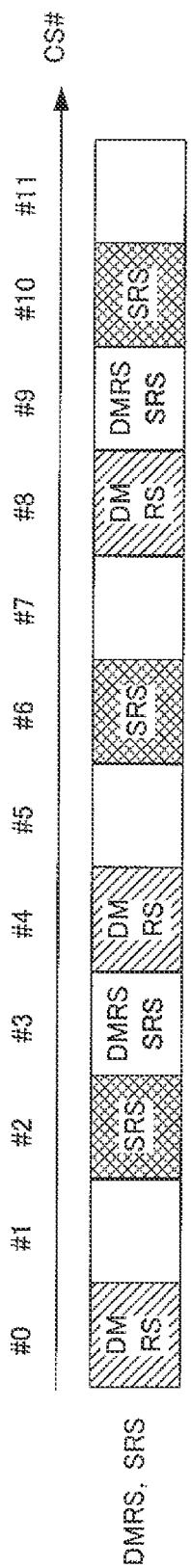
FIG. 14 is a diagram schematically showing definitions of the CS amount for DMRS and the CS amount for SRS when the multiplexing number is small.

Specifically, the frequency hopping is applied under a condition where the code multiplexing number of the DMRSs and SRSs is small (for example, a multiplexing number equal to six or less). As a result, one scheduling can transmit the SRSs to different bands in two positions of slots 1 and 2 per terminal, and the SRS capacity can be maintained. Under the condition where the multiplexing number is small, a sufficient CS interval of two CSs or more can be set as shown in FIG. 14, and the inter-code interference can be thus reduced. Therefore, the use of the same definition as that for the CS amount for DMRS allows easy code multiplexing of the CS amount for SRS at a CS interval of two CSs or more, and the interference can be thus reduced.

Meanwhile, the frequency hopping is not applied under a condition where the code multiplexing number of the DMRSs and SRSs is large (for example, a multiplexing number greater than six d the SRS is transmitted at one position per terminal. Here, the multiplexing number is prioritized, and the SRS capacity can be thus maintained. Moreover, as shown in FIG. 9, the orthogonality is formed by the axes of both the CS amount and the Walsh sequence, so that the influence of the interference can be reduced even if the code multiplexing number is large.

According to Embodiment 2, the definition of the CS amount for SRS is changed according to the information of the presence/absence of the inter-slot frequency hopping included in the scheduling information. In this way, the SRS capacity can be maintained regardless of the multiplexing number of the DMRSs and SRSs, and the inter-code interference can be also reduced.

Embodiment 3

The configuration of a terminal according to Embodiment 3 of the present invention is similar to the configuration shown in FIG. 4 of Embodiment 1 and is different in only the function of the CS amount determination unit 106. Therefore, FIG. 4 will be used, and different in the function will be described herein.

CS amount determination unit 106 holds the definitions of the CS amount for DMRS and the CS amount for SRS. The CS amount for SRS is defined and set in units (=symbol length/24) equal to a half of the units (=symbol length/12) used for setting the CS amount for DMRS. Details of CS amount determination unit 106 will be described later.

The configuration of a base station according to Embodiment 3 of the present invention is similar to the configuration shown in FIG. 5 of Embodiment 1 and is different in only the function of CS amount determination unit 208. CS amount determination unit 208 is similar to CS amount determination unit 106 included in the terminal according to Embodiment 3.

Next, an operation of CS amount determination unit 106 will be described. CS amount determination unit 106 determines the CS amount for RS based on the definition (correspondence between the CS notification information (3 bits) and the CS amount [s]) of the CS amount corresponding to the RS type, i.e. SRS or DMRS.

Figure 15:
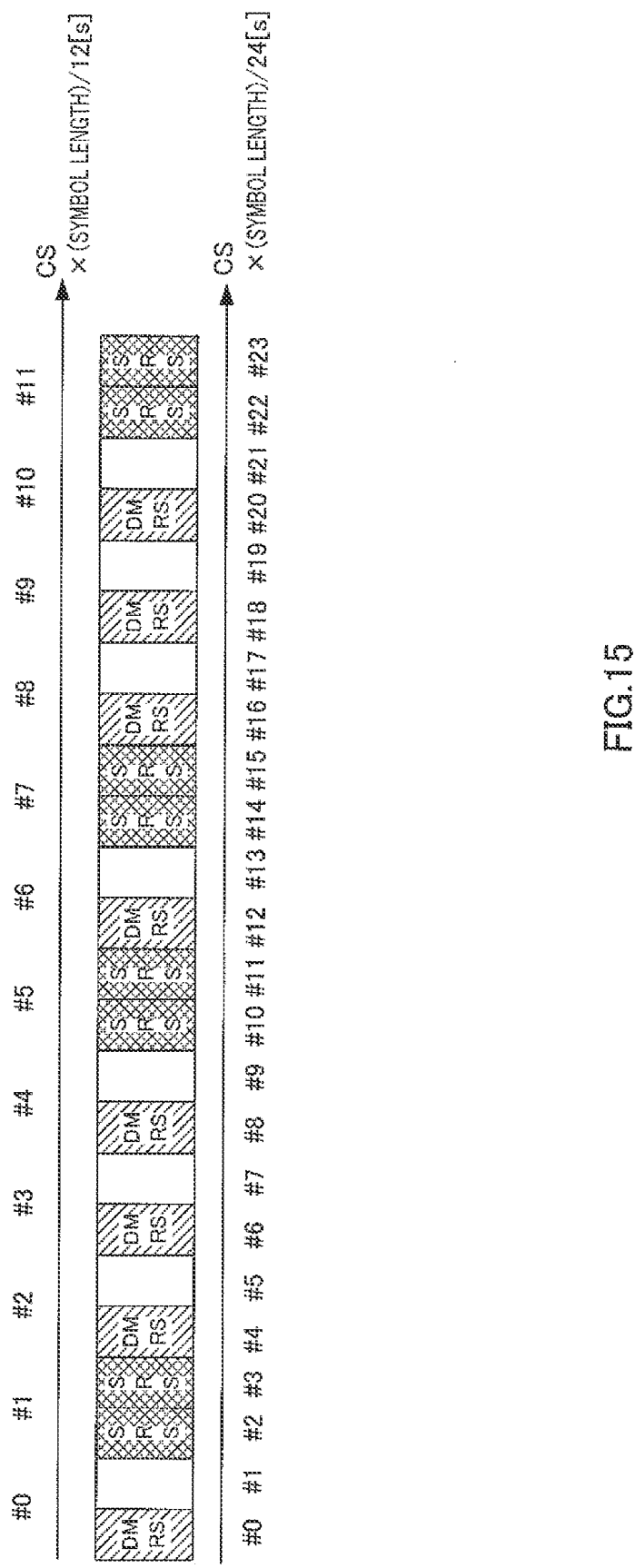
FIG. 15 is a diagram schematically showing definitions of the CS amount for DMRS and the CS amount for SRS according to Embodiment 3 of the present invention.

The CS amount for SRS is defined by a setting unit (=symbol length/24) that is half a setting unit (=symbol length/12) of the CS amount for DMRS. More specifically, 24 CS code resources of "0, 1, ... , 22, 23"×(symbol length)/24 [s] are defined. As shown in FIG. 15, the CS amounts not defined as the CS amount for DMRS, i.e. 2, 3, 10, 11, 14, 15, 22, 23"×(symbol length)/24 [s], are used for the CS amount for SRS. CS amount determination unit 106 holds the definitions of the CS amounts as shown in FIG. 16.

The setting unit of the CS amount needs to be set to a value greater than the maximum propagation delay time of the transmission signal from the terminal predicted in the system. This can reduce the inter-code interference with the adjacent CS amount. Compared to LTE, LTE-Advanced is a system mainly operated in an environment with a smaller cell diameter. The propagation delay time of the transmission signal from the terminal is small in the environment with a small cell diameter. Thus, the setting unit of the CS amount that can be separated by the CS can be reduced in this case. Therefore, as described, the inter-code interference is not significantly increased even if the CS amount for SRS is defined by intervals that are half the conventional intervals.

Figure 17:
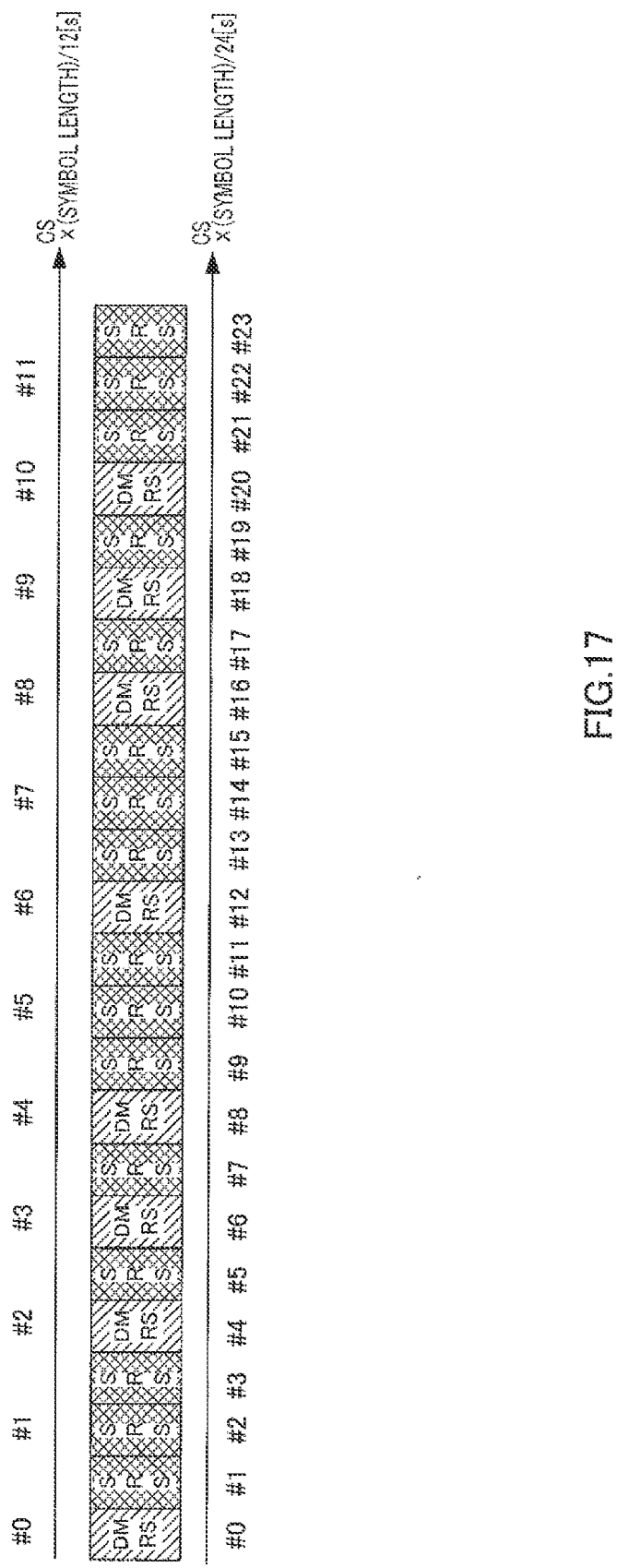
FIG. 17 is a diagram schematically showing other definitions of the CS amount for DMRS and the CS amount for SRS according to Embodiment 3 of the present invention.

If the notification of the CS amount for SRS includes 4 bits, 24 code resources can be all used by the SRS and DMRS as shown in FIG. 17. In this case, CS amount determination unit 106 holds the definitions of the CS amounts as shown in FIG. 18.

In this way, according to Embodiment 3, usable CS resources can be increased to improve the SRS capacity in the cell environment with a small propagation delay time for the transmission signal from the terminal.

Figure 19:
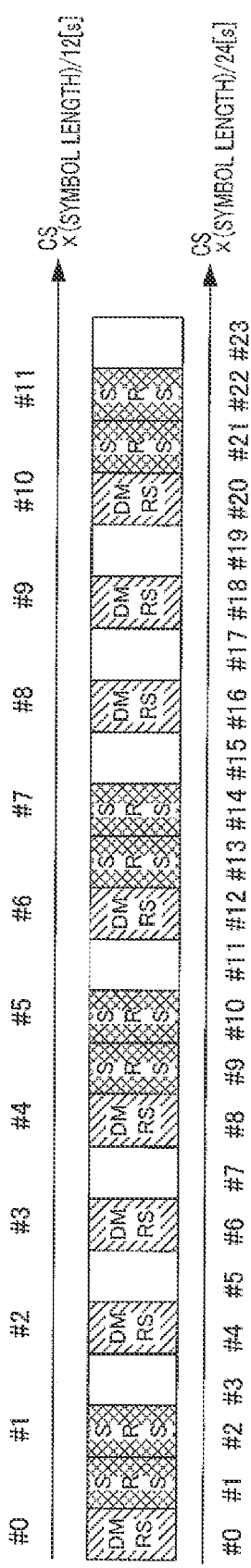
FIG. 19 is a diagram schematically showing yet other definitions of the CS amount for DMRS and the CS amount for SRS according to Embodiment 3 of the present invention.

Although the cases of defining the CS amounts for SRS as shown in FIG. 16 and FIG. 18 are described in the present embodiment, the CS amount for SRS may be defined as follows. The DMRS used to estimate the channel for data demodulation requires higher reception quality than the SRS used to estimate the channel quality for scheduling. Therefore, the CS amount for SRS is defined so that the CS that is located one CS before (left side in FIG. 19) the CS amount for DMRS is not used as shown in FIG. 19. More specifically, the interference components by the delayed wave significantly affect the following (right side in FIG. 19) CS. Therefore, no SRS is allocated to the CS before the DMRS, CS amount determination unit 106 holds the definitions of the CS amounts as shown in FIG. 20. In this way, defining the CS amounts for SRS while separating the CS positions of the SRS from the CS positions of the DMRS can reduce the interference from the SRS to the DMRS and thus can reduce the degradation in the reception quality of the DMRS that requires higher quality.

However, the symbol length (the number of subcarriers) of the SRS indicated by the base station needs to be limited to a multiple of 24. This can completely form orthogonality between the CS sequences.

Although multiplexing of the DMRS and SRS are described in the above embodiments, the present invention is not limited to this. For example, the SRS of LTE transmitted by the end symbol of a subframe and the scheduled SRS may be multiplexed.

The scheduled SRS refers to a reference signal not accompanying data for prompting transmission in the UL grant (uplink scheduling information notification), and this name may be different. For example, the scheduled SRS may be referred to as Aperiodic SRS.

Although an example of implementing the present invention by hardware is described in the above embodiments, the present invention can also be realized by software.

The functional blocks used in the description of the above embodiments are typically realized as an LSI, which is an integrated circuit. The functional blocks may be individually formed as a single chip, or formed into a single chip in such a way that part or all of the functional blocks is included in the chip. Although the integrated circuit is referred to as an LSI here, the integrated circuit may be referred to as an IC, system LSI, super LSI, or ultra LSI, depending on the difference in the degree of integration.

The method of integrating the functions into a circuit is not limited to the LSI, and a dedicated circuit or a general-purpose processor may be used. It is also possible to use a programmable FPGA (Field Programmable Gate Array) or a reconfigurable processor that can reconfigure the connection and setting of the circuit cells in the LSI after the production of the LSI.

If a technique of forming an integrated circuit that replaces the LSI is developed based on the progress in the semiconductor technology or based on another derived technique, the technique may be obviously used to integrate the functional blocks. Application of biotechnology or the like is possible.

Although the antenna is described in the above embodiments, the present invention can be similarly applied with an antenna port.

The antenna port refers to a logical antenna including one or a plurality of physical antennas. Therefore, the antenna port may not necessarily refer to one physical antenna and may refer to an array antenna or the like including a plurality of antennas.

For example, the number of physical antennas included in the antenna port is not defined in 3GPP LTE, and the antenna port is defined as a minimum unit for the base station to transmit a different reference signal.

The antenna port may also be defined as a minimum unit of multiplication of a weight of a pre-coding vector.

The disclosure of Japanese Patent Application No. 2010-006271, filed on Jan. 14, 2010, including the specification, the drawings, and the abstract, is incorporated herein by reference in its entirety.

INDUSTRIAL APPLICABILITY

The radio communication terminal al apparatus, the radio communication base station apparatus, and the radio communication method according to the present invention can be applied to, for example, a mobile communication system such as LTE-Advanced.

REFERENCE SIGNS LIST 101, 201 antennas
102, 202 reception RF units
103 demodulation unit
104 scheduling information decoding unit
105, 207, 302, 403 RS type judgment units
106, 208, 303, 404 CS amount determination units
107 RS generation unit
108 phase rotation unit
109, 305 mapping units
110 IFFT unit
111 CP addition unit
112 transmission RF unit
203 CP removing unit
204 FFT unit
205 scheduling information holding unit
206, 402 demapping units
209 channel estimation unit
301, 401 frequency hopping setting units
304 Walsh sequence multiplication unit
405 combining unit

The invention claimed is:

1. A radio communication terminal apparatus comprising:
a receiver configured to receive notification information for notifying an amount of cyclic shift used for a reference signal;
a determination unit configured to determine the amount of cyclic shift corresponding to the received notification information for a data demodulation reference signal or a sounding reference signal, an amount of cyclic shift not included in the amount of cyclic shift for the data demodulation reference signal being set as the amount of cyclic shift for the sounding reference signal and being associated with the notification information along with the amount of cyclic shift for the data demodulation reference signal; and
a transmitter configured to transmit the data demodulation reference signal or the sounding reference signal using the determined amount of cyclic shift,
wherein the determination unit applies, when no inter-slot frequency hopping is performed, the amount of cyclic shift for the sounding reference signal associated with the amount of cyclic shift obtained by shifting the amount of cyclic shift for the data demodulation reference signal by one, and applies, when inter-slot frequency hopping is performed, the amount of cyclic shift for the data demodulation reference signal as the amount of cyclic shift for the sounding reference signal.

2. A radio communication terminal apparatus comprising:
a receiver configured to receive notification information for notifying an amount of cyclic shift used for a reference signal;
a determination unit configured to determine the amount of cyclic shift corresponding to the received notification information for a data demodulation reference signal or a sounding reference signal, an amount of cyclic shift not included in the amount of cyclic shift for the data demodulation reference signal being set as the amount of cyclic shift for the sounding reference signal and being associated with the notification information along with the amount of cyclic shift for the data demodulation reference signal; and
a transmitter configured to transmit the data demodulation reference signal or the sounding reference signal using the determined amount of cyclic shift, wherein
a setting unit of the amount of cyclic shift for the sounding reference signal is half of a setting unit of the amount of cyclic shift for the data demodulation reference signal, and
the amount of cyclic shift for the sounding reference signal does not include an amount of cyclic shift located at a position right of an amount of one forward shifted cyclic shift of the data demodulation reference signal.

* * * * *